United States Patent [19]

Tokarz et al.

[11] Patent Number: 4,863,190
[45] Date of Patent: Sep. 5, 1989

[54] PASSIVE RESTRAINT FOR CONVERTIBLE-TYPE VEHICLES

[75] Inventors: Stephen P. Tokarz, Lincoln Park; Lon A. Zaback; Thomas Pavlak, both of Detroit; Donald R. Varner, Allen Park, all of Mich.

[73] Assignee: ASC Incorporated, Southgate, Mich.

[21] Appl. No.: 155,201

[22] Filed: Apr. 11, 1988

[51] Int. Cl.$^4$ .............................................. B60R 22/24
[52] U.S. Cl. .................................... 280/808; 297/483
[58] Field of Search ............... 280/801, 802, 804, 808, 280/803; 297/482, 483

[56] References Cited

U.S. PATENT DOCUMENTS

| | | | |
|---|---|---|---|
| 4,213,638 | 7/1980 | Sacco et al. | 280/808 |
| 4,315,639 | 2/1982 | Booth et al. | 280/803 |
| 4,315,640 | 2/1982 | Nakazato | 280/808 |
| 4,372,578 | 2/1983 | Takizawa et al. | 280/802 |
| 4,417,751 | 11/1983 | Packington | 280/802 |
| 4,536,010 | 8/1985 | Matsunami | 280/802 |
| 4,621,835 | 11/1986 | Edwards | 280/803 |
| 4,708,366 | 11/1987 | Doty | 280/803 |
| 4,747,616 | 5/1988 | Burris | 280/803 |

*Primary Examiner*—Richard A. Bertsch
*Attorney, Agent, or Firm*—Arnold S. Weintraub; William D. Blackman

[57] ABSTRACT

A three-point passive restraint system for a convertible-type vehicle includes first a shoulder belt retractor and a lap belt retractor mounted interiorly of the vehicle onto the inner door structure thereof. A pillar is rigidly secured to the door structure and projects thereabove and includes a guide for directing or guiding the shoulder belting associated with the restraint system. Optionally, the restraint system may include a secondary door locking system including a locking pin mounted onto the pillar which is releasably engaged by a keeper formed on a second pillar mounted on the rear quarter panel of the vehicle.

8 Claims, 2 Drawing Sheets

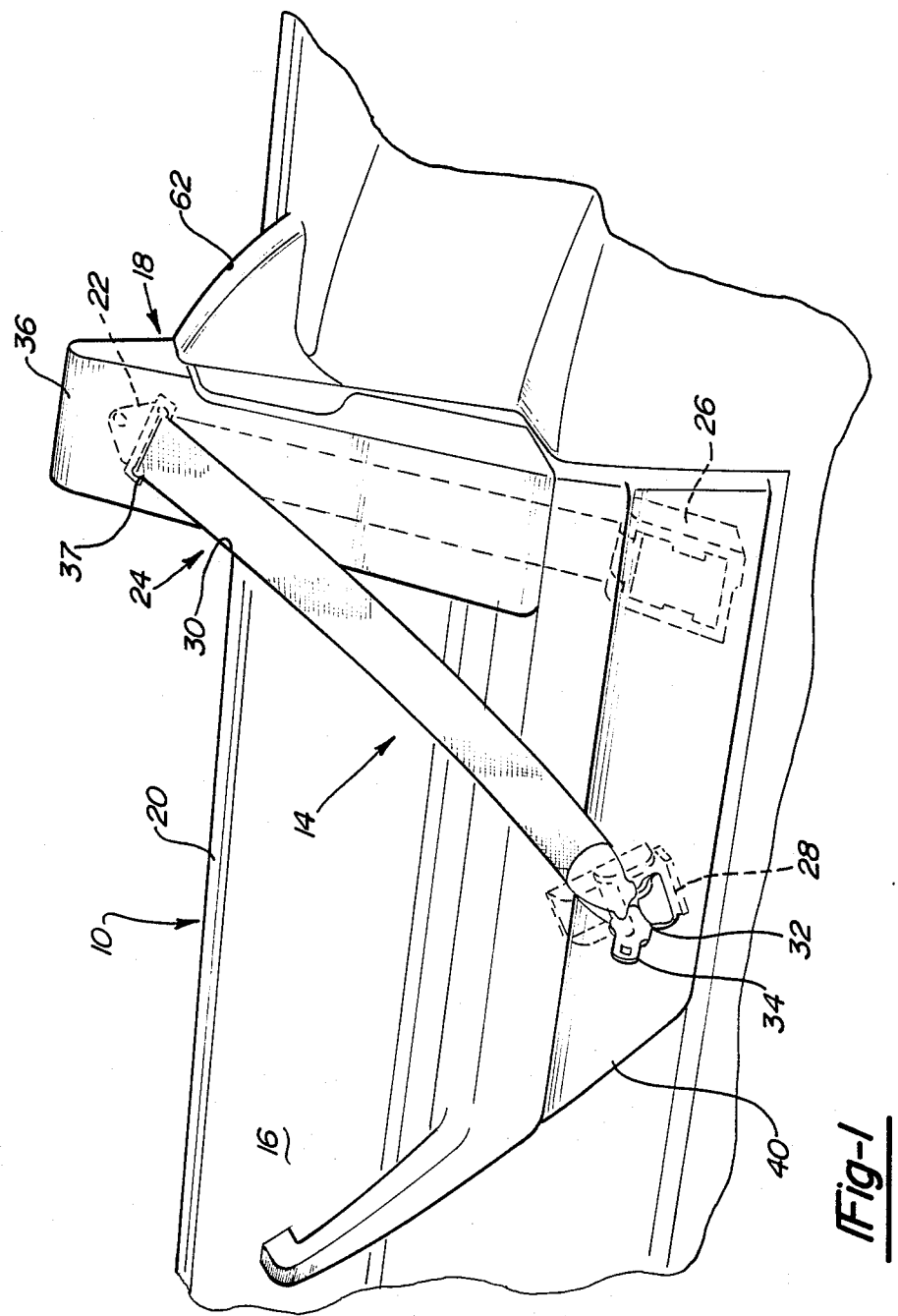

PASSIVE RESTRAINT FOR CONVERTIBLE-TYPE VEHICLES

BACKGROUND OF THE INVENTION

1. Field of the Invention

The present invention relates to automative passive restraint systems. More particularly, the present invention concerns automotive passive restraint systems for convertible-type vehicles. Even more particularly, the present invention concerns a three-point passive restraint system for a convertible-type vehicle.

2. Prior Art

The advent of modern-day convertible-type vehicles has given rise to much improved technology over previous convertible-type vehicles. The popularity of the present-day convertible-type vehicles when coupled with governmental regulations has seen the advent of improved structural supports, safety systems, improved materials of construction and the like.

Recently, governmental regulations have called for the imposition and the requirement of new passive restraint systems for utilization in such vehicles. In fact, it has now been mandated by governmental agencies that by 1990, convertible-type vehicles, as well as all other types of vehicles, have passive restraint systems. Presently, there are two recognized passive restraint systems, to wit, air bags and three-point safety or seat belt systems. Because of the cost associated with air bags, it is impractical to incorporate such into lower priced vehicles. Thus, there exists a need for a passive restraint system which meets the presently mandated governmental regulations and which can be economically installed in lower-priced convertible-type vehicles.

As is known to those skilled in the art to which the present invention pertains, present restraint systems which are associated with convertible-type vehicles ordinarily have the safety belt extending from the rear quarter panel pillar from which the belts then extend over the lap and shoulder of the occupant of the vehicle. Such systems fail to meet governmental mandates.

As will be subsequently detailed herein, there is provided an improved passive restraint system which will meet governmental regulations and which is economically incorporated into lower priced convertible-type vehicles.

SUMMARY OF THE INVENTION

In accordance with the present invention there is provided a three-point passive restraint system for vehicles and, in particular, convertible-type vehicles having sashless doors which, generally, comprises:

(a) a pillar rigidly affixed to the inner sashless door structure of a vehicle and which projects therefrom above the belt line thereof the pillar being formed from a material having sufficient structural rigidity and strength to provide crash resistance and to restrain an occupant of the vehicle who may impact thereagainst;

(b) a first safety belt retractor rigidly mounted onto the inner door structure and being vertically spaced apart from the pillar;

(c) a second safety belt retractor substantially horizontally spaced from the first retractor and rigidly mounted to the inner door structure;

(d) means for guiding a shoulder belting mounted onto the upwardly projecting pillar and which guides a shoulder belting therethrough; and (e) a lap and shoulder belting for enveloping an occupant of a vehicle.

The belting includes a conventional clasp which interconnects the shoulder and lap belting and which engages a seatbelt safety lock ordinarily disposed on the seating or affixed to the seating of the vehicle.

The belting is of conventional construction as ordinarily employed as in the art as are the retractors.

Optionally, the upstanding pillar may include a pillar locking pin which engages a keeper mounted on the rear quarter panel of the vehicle. Where used, the secondary locking system maintains the pillar in position in the event of a front end impact to thus provide secondary or dual locking to add further safety to the vehicle.

For a more complete understanding of the present invention, reference is made to the following detailed description and accompanying drawing. In the drawing, like reference characters refer to like parts throughout the several views in which:

BRIEF DESCRIPTION OF THE DRAWING

FIG. 1 is a partial front plan view of a door panel incorporating the passive restraint system of the present invention;

DESCRIPTION OF THE PREFERRED EMBODIMENTS

Figure 3:
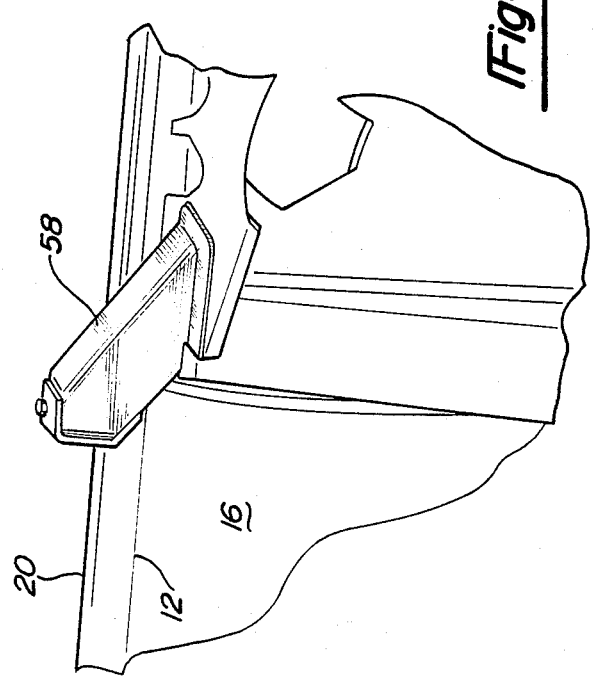
FIG. 3 is a partial plan view of the pillar mounted on the front door panel and the upstanding pillar of the rear quarter panel showing the secondary locking system.
Figure 3A:
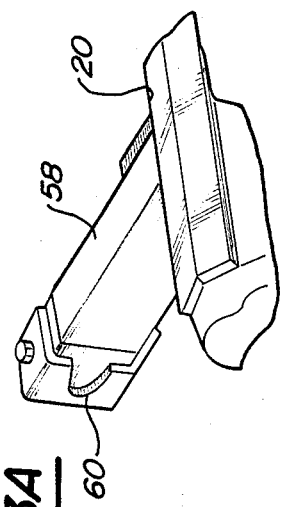
FIG. 3A is a partial perspective view taken in the direction of the arrow A of FIG. 3, showing the keeper.
Figure 2:
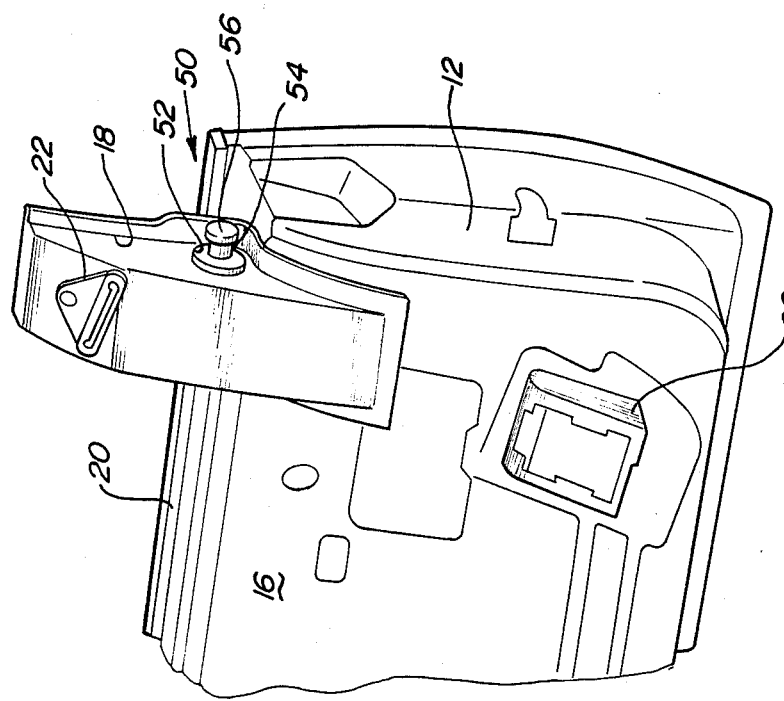
FIG. 2 is a partial front plan view of the passive restraint system of the present invention with the trim pieces being removed.

Now, and with reference to the drawing, and as hereinabove noted, there is provided a three-point passive restraint system for a convertible-type vehicle having sashless doors which, generally, comprises:

(a) a pillar or tower rigidly affixed to an inner door sashless structure of a vehicle and which projects upwardly therefrom above the belt line of the vehicle the pillar being formed from a material having sufficient structural rigidity and strength to provide crash resistance and to restrain an occupant of the vehicle who may impact thereagainst;

(b) a first safety belt retractor rigidly mounted onto the inner door structure and being vertically spaced apart from the pillar;

(c) a second safety belt retractor substantially horizontally spaced from the first retractor and rigidly mounted to the inner door structure;

(d) means for guiding a shoulder belting mounted on the upwardly projecting pillar and which guides a shoulder belting from therethrough; and (e) a lap and shoulder belting for enveloping an occupant of a vehicle.

With more particularity, the present invention is directed to a convertible-type vehicle, generally, denoted at 10 having an inner door structure 12 to which there is mounted a passive restraint system, generally, denoted at 14. The passive restraint system 14 is mounted to the interior side 16 of the door structure 12.

As shown in FIG. 1, the system 14 includes a pillar or tower 18 which is rigidly affixed to the door structure 12, such as by welding, riveting or the like and is, thus, rendered functionally integral with the door structure. The pillar 18 is mounted proximate the top of the door 12 and projects upwardly therefrom above the belt line 20 of the vehicle. The pillar 18 is made from a material having sufficient structural rigidity and strength to provide crash resistance as well as to restrain an occupant who may impact thereagainst. By having the pillar 18 project above the belt line 20 there is provided a safety restraint and impact resistance structure if an occupant is laterally impacted against the door panel. Likewise, the positioning of the pillar permits an occupant to enter the vehicle 10 under a shoulder belt.

Means, for guiding a shoulder belt; such as a ring or guide loop 22, is fixed to the pillar 18. The guide loop 22 enables a shoulder belting 24 to be therethrough guided from its associated retractor and to a safety belt clasp, as is subsequently detailed.

A shoulder belt or belting retractor 26 is rigidly affixed to the interior of the door panel by any suitable manner, such as by welding, riveting or the like. The shoulder belt retractor 26 is vertically spaced apart from the pillar 18 and is disposed therebelow.

A lap belt or belting retractor 28 is, also, rigidly affixed and mounted onto the interior 16 of the door structure 12. The lap belt retractor is substantially horizontally spaced apart from the shoulder belt retractor 26, as shown. As noted, the shoulder belt retractor 26 and the lap belt retractor 28 are substantially axially displaced and lie in substantially the same horizontal plane.

The belting 24, generally, comprises a shoulder belt 30 which extends from the retractor 26 from which it passes through the guide loop. The belting further includes a lap belt 32 which is connected to the retractor 28 and is extensible and retractable therefrom.

As is known to those skilled in the art to which the present invention pertains, the shoulder belt 30 and lap belt 32, respectively, are interconnected and joined via a clasp 34 which locks into a seatbelt lock (not shown) usually mounted on the seating of the vehicle. The clasp permits both the shoulder belt and lap belt to be extended or retracted simultaneously as desired or required.

It is to be noted that in the practice of the present invention the actual construction of the retractors is not critical hereto. Thus, standard state of the art seatbelt retractors may be used in the practice of the present invention such as, for example, that disclosed in the U.S. Pat. No. 4,611,770 and U.S. Pat. No. 4,537,363.

Referring again to the drawing, in order to render the restraint system 14 hereof aesthetically appealing, a first trim piece 36 encases the pillar 18. The trim piece 36 has an aperture formed proximate the guide loop 22 and which permits the shoulder belt 30 to project therethrough into the interior of the vehicle. A second trim piece 40 encases the retractors 26 and 28. The second trim piece 40 has an aperture 42 formed proximate the lap belt retractor 28 which permits the lap belt 32 to project therethrough into the interior of the vehicle.

It is thus to be appreciated that the restraint systems hereof is entirely incorporated with and associated with the door panel of the vehicle. Such a mounting construction satisfies all of the presently mandated governmental regulations regarding safety belt restraint system.

Referring, again, to the drawing, the present invention further enables the disposition and incorporation of a dual or secondary door locking assembly to add further safety to the vehicle. In conjunction herewith, the present invention contemplates not only the standard door locking mechanism but a secondary locking system generally denoted at 50. The secondary locking system 50 includes a locking pin 52 rigidly affixed to the pillar 18 and which projects laterally outwardly therefrom toward the rear of the vehicle. The locking pin is disposed either at or slightly above the belt line 20 of the vehicle. The locking pin, per se, is of a construction generally known in the industry and comprises a shaft 54 having a first end secured to the pillar 18. The second or free end of the shaft 54 has an enlarged diameter or flange section 56 formed thereat.

Mounted onto the rear quarter panel, interiorly of the vehicle, is a second pillar 58 having a cutout section or keeper 60 formed therein. The second pillar 58 projects above the belt line 20 of the vehicle 10. The keeper 60 disengageably receives and retains the locking pin 52 within the pillar 58 upon the closing of the door. The keeper 60, thus, defines a guide path for the locking pin 52.

A trim piece 62 envelopes the second pillar 58 to render the assembly aesthetically appealing.

By providing the secondary locking system further safety is incorporated into the vehicle, in that if an occupant is pitched forward the flange abuts against the keeper to prevent the pillar 18 from torquing forwardly to thus maintain th restraint system in place.

It is to be appreciated that there has been described herein a passive restraint system which meets all governmental mandates and which is entirely incorporated into the door panel of the vehicle.

Having, thus, described the invention, what is claimed is:

1. A three-point passive restraint system for a convertible-type vehicle having sashless doors comprising:
    (a) a pillar rigidly affixed to a sashless door structure of a vehicle and which projects upwardly therefrom above the belt line of the vehicle, the pillar being formed from a material having sufficient structural rigidity and strength to provide crash resistance and to restrain an occupant of the vehicle who may impact thereagainst;
    (b) a first safety belt retractor rigidly mounted onto the door structure and being vertically spaced apart from the pillar;
    (c) a second safety belt retractor rigidly mounted onto the door structure and being horizontally spaced apart from the first retractor;
    (d) means for guiding a belting, the means for guiding being mounted on the pillar; and
    (e) a belting having a first belt portion being extensible and retractable from the first retractor and which is guided by the means for guiding, and a second belt portion being extensible and retractable from the second retractor.

2. The passive restraint system of claim 1 which further comprises a first trim piece which envelopes the pillar, the first trim piece having an aperture formed therein, the aperture being disposed proximate the means for guiding and which permits a belt portion to project therethrough.

3. The restraint system of claim 2 further comprising a second trim piece which envelopes the first and second retractors, the second trim piece having an aperture formed therein proximate the second retractor and which permits the second belt portion to project therethrough into the interior of the vehicle.

4. The restraint system of claim 1 wherein the means for guiding comprises a guide loop secured to the pillar, a belt portion being guided through the guide loops.

5. The restraint system of claim 1 further comprising a secondary door locking system.

6. The restraint system of claim 5 wherein the secondary locking system comprises:
   a. a locking pin fixedly mounted to the pillar and projecting laterally rearwardly therefrom;
   b. a keeper mounted on a rear quarter panel of a vehicle which disengagably receives and retains the locking pin.

7. A three-point passive restraint system for a convertible-type vehicle having sashless doors comprising:
   (a) a first pillar rigidity affixed to a sashless door structure of a vehicle and which projects upwardly therefrom above the belt line of the vehicle, the pillar being formed from a material having sufficient structural rigidity and strength to provide crash resistance and to restrain an occupant of the vehicle who may impact thereagainst;
   (b) a first safety belt retractor rigidly mounted onto the door structure and being vertically spaced apart from the pillar;
   (c) a second safety belt retractor rigidly mounted onto the door structure and being horizontally spaced apart from the first retractor;
   (d) means for guiding a belting, the means for guiding being mounted on the pillar;
   (e) a belting having a first belt portion being extensible and retractable from the first retractor and which is guided by the means for guiding, and a second belt portion being extensible and retractable from the second retractor; and
   (f) a secondary door locking system comprising:
      (1) a locking pin fixedly mounted to the pillar and projecting laterally rearwardly therefrom; and
      (2) a second pillar disposed within the interior of the vehicle on a rear quarter panel thereof and projecting upwardly therefrom, the second pillar having a keeper thereon which releasably retains the locking pin.

8. The passive restraint system of claim 7 wherein the first and second pillars project above the beltline of a vehicle.

* * * * *